3,265,467
NON-CAKING SULFAMIC ACID AND METHOD
OF MAKING SAME
Robert T. Nelson, Crown Point, and Michael Z. Zatorski, East Chicago, Ind., assignors to E. I. du Pont de Nemours and Company, Wilmington, Del., a corporation of Delaware
No Drawing. Filed Mar. 2, 1964, Ser. No. 348,795
8 Claims. (Cl. 23—166)

This invention relates to sulfamic acid. More particularly, this invention refers to a novel and efficient method of making sulfamic acid crystals non-caking and dust-free.

Crystalline sulfamic acid normally cakes during storage. This causes problems in handling and using the product. For example, drums of sulfamic acid crystals frequently have to be sledge hammered to discharge the material. Furthermore, crystalline sulfamic acid presents a highly objectionable dust problem. Usually, agents added to sulfamic acid to minimize caking have a tendency to aggrevate the dusting problem.

According to the present invention, both problems described above are significantly reduced or eliminated completely with use of a single treating agent by admixing with the sulfamic acid crystals from about 0.05 to about 0.5% by weight of an agent selected from the group consisting of sulfuric acid, orthophosphoric acid, acetic acid, glycerine, and mixtures thereof. Even smaller amounts of the treating agent can effect some benefit. Amounts above about 0.3% do not appear to increase significantly the advantage obtained in the preferred range of 0.15 to 0.25% although the upper limit is determined more by a desire to avoid mushiness, drying problems, handling problems and product impurity than by any lack of effectiveness in solving the problems mentioned above.

According to the present invention, any method can be used which more or less uniformly mixes the sulfamic acid and the desired treating agent. While the order of mixing is not critical, it is of course most convenient to add the treating agent to sulfamic acid in a sutiable solid-liquid blending apparatus, such as a ribbon blender, rolling drum, or the like. The treating agent can be dropped or poured onto the sulfamic crystals or, if desired, sprayed to aid in uniform application.

The use of any of the treating agents of the invention has the excellent advantage, in addition to those described above, in that these materials are compatible additives which do not cause aqueous solutions of the product to be objectionably turbid.

It will be understood that the salts of sulfamic acid are contemplated within the purview of this invention. This includes such salts as the alkali metal and alkaline earth metal salts. Typical are the potassium, sodium, calcium, and lithium salts.

The treating agents are preferbly employed in a substantially anhydrous form although the use of these agents in aqueous solution is permissible insofar as the ability of the treating agent to absorb additional water is not impaired.

The admixing of the sulfamic and the treating agent of the invention can take place conveniently at room temperature. While temperatures of 0°–150° C. are satisfactory, the choice will be largely one of convenience. The temperature limits of this range are not especially critical and are determined by such obvious considerations as decomposition factors and the like. From 20° to 75° C. appears most convenient and suitable.

The following examples are given for purpose of illustration:

To 357 parts by weight of sulfamic acid crystals at about 70° C. is added .82 part by weight of 96% concentrated sulfuric acid. These are mixed for 20 minutes in a ribbon blender and the product put in drums for storage. After an extended period the product is remarkably non-caking and dust-free.

The preceding example is repeated using 5 parts by weight of 85% reagent grade $H_3PO_4$ in place of the sulfuric, to treat 2,000 parts by weight of sulfamic acid crystals at 25° C. with similar excellent results.

To 100 parts by weight of sulfamic acid crystals, 1 part by weight of 97% concentration acetic acid is added at about 70° C. This composition is mixed for about 30 minutes in a ribbon blender and the product is then put in drums for storage. Following an extended period of storage the product exhibits a combination of non-caking and dust-free characteristics.

In manner similar to the above example, 1 part by weight of anhydrous glycerine is admixed with 100 parts by weight of sulfamic acid crystals. The product observed after an extended period of storage also exhibits a combination of non-caking and dust-free characteristics.

Other variations and embodiments of this invention can be carried out in accordance with the teachings herein without departing from the intended scope.

We claim.

1. The method of improving the handling properties of crystalline sulfamic acid which comprises admixing with said sulfamic acid from 0.05 to about 0.5% by weight of a compound selected from the group consisting of sulfuric acid, orthophosphoric acid, and acetic acid; said admixing being carried out at a temperature from about 0° to 150° C.

2. The method as set forth in claim 1 wherein said temperature is from 20° to 75° C.

3. The method as set forth in claim 2 wherein from 0.15 to 0.25% by weight of sulfuric acid is used.

4. Crystalline sulfamic acid having uniformly distributed on its surface from about 0.05 to about 0.5% by weight of a compound selected from the group consisting of sulfuric acid, orthophosphoric acid, and acetic acid.

5. Crystalline sulfamic acid having uniformly distributed on its surface from about 0.05 to about 0.5% by weight of orthophosphoric acid.

6. Crystalline sulfamic acid having uniformly distributed on its surface from about 0.05 to about 0.5% by weight of acetic acid.

7. Crystalline sulfamic acid having uniformly distributed on its surface from about 0.05 to about 0.5% by weight of glycerine.

8. The method of improving the handling properties of crystalline sulfamic acid which comprises admixing said sulfamic acid with from 0.05 to about 0.5% by weight of glycerine at a temperature of from about 0° to 150° C.

References Cited by the Examiner

UNITED STATES PATENTS

| | | | |
|---|---|---|---|
| 2,191,754 | 2/1940 | Cupery | 23—166 |
| 2,408,492 | 10/1946 | Tauch | 23—166 |

OSCAR R. VERTIZ, *Primary Examiner.*

MAURICE A. BRINDISI, R. M. DAVIDSON,
*Examiners.*

A. J. GREIF, *Assistant Examiner.*